United States Patent [19]

Kobayashi et al.

[11] Patent Number: 4,831,112

[45] Date of Patent: May 16, 1989

[54] BIAXIALLY ORIENTED POLY-P-PHENYLENE SULFIDE FILM

[75] Inventors: Hiroaki Kobayashi; Yukichi Deguchi, both of Ootsu, Japan

[73] Assignee: Toray Industries, Inc., Tokyo, Japan

[21] Appl. No.: 176,034

[22] Filed: Mar. 31, 1988

[30] Foreign Application Priority Data

Mar. 31, 1987 [JP] Japan .................................. 62-78359

[51] Int. Cl.$^4$ ............................................. C08G 75/14
[52] U.S. Cl. .................................. 528/388; 524/401; 524/428; 524/436; 524/439; 528/493; 528/494; 528/499
[58] Field of Search ............... 528/388, 493, 494, 499; 524/401, 428, 436, 439

[56] References Cited

U.S. PATENT DOCUMENTS

| | | | |
|---|---|---|---|
| 4,102,954 | 7/1978 | Coale | 528/388 |
| 4,286,018 | 8/1981 | Asakura et al. | 528/388 |
| 4,629,778 | 12/1986 | Sugie et al. | 528/388 |

*Primary Examiner*—Harold D. Anderson
*Attorney, Agent, or Firm*—Austin R. Miller

[57] ABSTRACT

Disclosed is a biaxially oriented poly-p-phenylene sulfide film prepared from a resin composition comprising poly-p-phenylene sulfide as its principal component, 20-1000 ppm of at least one metal belonging to IA group or IIA group of the periodic table and 100-600 ppm of nitrogen, the poly-p-phenylene sulfide having an weight average molecular weight Mw of 30,000-90,000, and a ratio of weight average molecular weight to number average molecular weight Mw/Mn of 3-10. The film of the present invention has an excellent mechanical properties and dimensional stability, as well as excellent clearness.

9 Claims, No Drawings

BIAXIALLY ORIENTED POLY-P-PHENYLENE SULFIDE FILM

BACKGROUND OF THE INVENTION

I. Field of the Invention

This invention relates to a biaxially oriented poly-p-phenylene sulfide film. More particularly, this invention relates to a biaxially oriented poly-p-phenylene sulfide film with excellent mechanical properties and dimensional stability.

II. Description of the Related Art

In recent years, biaxially oriented films of poly-p-phenylene sulfide (hereinafter referred to as PPS for short) are drawing attention as F class electric insulating thin materials in the field of various electric apparatuses and electronic parts because of their excellent thermal resistance and hydrolysis resistance. Although conventional PPS films have a number of advantages, they also have drawbacks, when compared with polyethyleneterephthalate films which are widely used industrial films, in that they have poor mechanical properties, especially low tensile strength at break, and have too large thermal expansion coefficient.

PPS resins have been mainly studied as a resin for injection molding. Therefore, as to the resin composition suitable for forming PPS films, although there are teachings about the molecular weight of PPS and its degree of crosslinkage (or the viscosity of molten PPS and non-Newtonian coefficient) (Japanese Patent Disclosure (Kokai) No. 62121/81) and the relationship between the viscosity of molten PPS and its molecular weight (Japanese Patent Disclosure (Kokai) No. 89026/86), the idea to link the chemical composition of the polymer or the molecular weight distribution of the polymer with the film properties has not yet been suggested at all.

It is known, however, that a PPS resin suitable for forming films may be obtained by reducing the content of sodium chloride which is a byproduct as small as possible by intensively washing the polymer with water. However, by this method, although the content of the contaminants is decreased so that the clearness of the obtained film is improved, the mechanical properties and dimensional stability of the obtained film are not satisfactory.

Further, it is known that crystallization of PPS can be influenced by treating PPS with an oxide or a hydroxide of a metal cation so as to incorporate the metal cation in the polymer in the amount of 50–5000 ppm (Japanese Patent Disclosure (Kokai) No. 78257/82). By this method, although the rate of crystallization can be promoted, the mechanical properties and the dimensional stability of the resulting film are not satisfactory.

SUMMARY OF THE INVENTION

Accordingly, the object of the present invention is to provide a biaxially oriented PPS film with excellent mechanical properties and dimensional stability, as well as excellent clearness and defect-free properties.

The present invention provides a biaxially oriented poly-p-phenylene sulfide film comprising poly-p-phenylene sulfide as its principal component, 20–1000 ppm of at least one metal belonging to IA group or IIA group of the periodic table and 100–600 ppm of nitrogen, the poly-p-phenylene sulfide having an weight average molecular weight Mw of 30,000–90,000, and a ratio of weight average molecular weight to number average molecular weight Mw/Mn of 3–10.

The PPS film of the present invention excells in mechanical properties, especially in tensile strength at break. Further, the PPS film of the present invention has an excellent dimensional stability. In other words, the thermal expansion coefficient of the PPS film of the present invention is small. Since the PPS films are often used in contact with metal as in the case of dielectric material of capacitors, the thermal expansion coefficient thereof is preferred to be as close as possible to that of the metal, which is smaller than those of the conventional PPS films. In view of this, the great dimensional stability or the small thermal expansion coefficient of the PPS film of the present invention is desirable. Still further, since the PPS employed for the preparation of the PPS film of the present invention has an excellent thermal stability, even if the polymer is kept at molten state for a long time in the extrusion process, lowering of the viscosity and foaming due to the decomposition of the polymer do not occur, so that the resulting film has a high clearness, is substantially free from fine foams and is excellent in long-term durability.

DETAILED DESCRIPTION OF THE PREFERRED EMBODIMENTS

The term "poly-p-phenylene sulfide" herein means polymers containing the recurring unit represented by the formula [I] in the rate of not less than 70 mol %, preferably not less than 85 mol %, based on all the recurring units contained in the polymer.

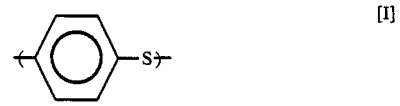

If the content of the recurring unit represented by the formula [I] is less than 70 mol %, the crystallinity and the thermal transition temperature is lowered, so that the thermal resistance, dimensional stability and mechanical properties of the resulting film are degraded. The PPS may contain one or more copolymerizable recurring units containing sulfide bond, other than the phenylene sulfide unit represented by the formula [I] in the rate of not more than 30 mol %. Examples of such recurring units may include those represented by the formula [II]–[VI].

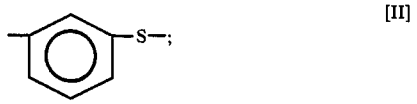

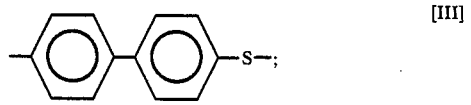

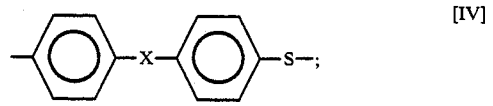

-continued

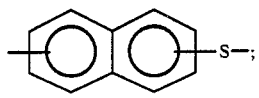   [V]

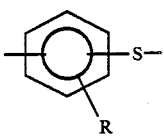   [VI]

(wherein R represents —COOH or —SO₃H, X represents —CH₂—,

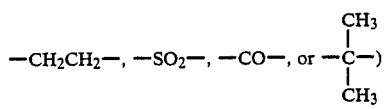

The film of the present invention comprises 50–1000 ppm, preferably 100–500 ppm, based on the weight of the PPS, of at least one metal belonging to the IA group or IIA group in the periodic table. Preferred examples of the metal belonging to the IA group of the periodic table include lithium, sodium and potassium. Since sodium sulfide is often used as a polymerization material, the sodium originating from the sodium sulfide may conveniently employed as the IA group metal. Preferred examples of the metal belonging to IIA group in the periodic table include magnesium, calcium and barium. Among these, especially preferred are magnesium and calcium, and the most preferred one is calcium. It is also preferred that the film contain both sodium and calcium. The metal belonging to IA or IIA group in the periodic table is solved or is incorporated within the polymer chain of the polymer, and does not exist as heterogenous particles. Therefore, in cases where the film comprises inorganic particles containing the metal, which are added to the film in the film-forming step, in order to determine the above-mentioned metal content, the inorganic particles must be removed by, for example, filtering the molten or dissolved polymer using a filter with sufficiently small pore size before measuring the metal content.

If the metal content is more than the upper limit of the above-mentioned range, the clearness of the film may be degraded, the surface roughness of the film may become uncontrollable, and the mechanical properties of the film may be degraded. This seems because that the stretching of the PPS molecules is hindered, so that sufficient orientation of the PPS molecules is not attained. If the metal content is less than the lower limit of the above-mentioned range, the thermal stability of the polymer is lowered, so that the resulting film may contain fine bubbles due to the foaming in the melt-extrusion process.

The PPS film of the present invention contains 100 to 600 ppm, preferably 150–500 ppm of nitrogen, based on the weight of the PPS. If the nitrogen content is more than 600 ppm, the mechanical properties of the film may be degraded. On the other hand, if the nitrogen content is less than 100 ppm, the resulting film may contain bubbles and the properties of the film may be degraded. Nitrogen seems to be derived from the solvent employed in the polymerization for forming PPS.

The PPS constituting the PPS film of the present invention has a weight average molecular weight Mw of 30,000 to 90,000, preferably 40,000 to 75,000. If the weight average molecular weight is less than 30,000, the mechanical properties of the resulting film are not satisfactory and if the weight average molecular weight is more than 90,000, the casting may become difficult.

The molecular weight distribution coefficient, i.e., the ratio of the weight average molecular weight to the number average molecular weight Mw/Mn of the PPS constituting the PPS film of the present invention is 3–10, preferably 4–8. If the Mw/Mn ratio is more than 10, the mechanical properties of the resulting film may be degraded. On the other hand, PPS with an Mw/Mn ratio of less than 3 is difficult to industrially manufacture.

The biaxially oriented PPS film of the present invention which suffices the above-mentioned requirement has an excellent mechanical properties and dimensional stability.

Although not restricted, the preferred draw ratio of the biaxially oriented film of the present invention is 3 to 5 times, more preferably 3.5 to 4.5 times the original length in the longitudinal direction and 2.5 to 4.5 times, more preferably 3 to 4 times the original length in the transverse direction.

It is also preferred that the PPS film of the present invention have a glass transition temperature of 90°–95° C., more preferably 92°–95° C. If the PPS film has a glass transition temperature falling within the above-mentioned range, the mechanical properties and the dimensional stability are further promoted.

The thickness of the PPS film of the present invention is not restricted at all, and is usually 0.5 to 200 μm, preferably 1 to 150 μm.

The PPS film of the present invention may contain additives such as inorganic fillers, lubricants, slip agents, antistatic agents, UV absorbers and antioxidants for the purpose of forming desired surface and improving color and quality. Further, the PPS used for the preparation of the film of the present invention may be blended with other polymers as long as the properties of the film are not degraded. The content of the additives and/or the blended polymers may preferably be 20% or less, more preferably 10% by weight or less based on the total weight of the resin composition. It should be noted, however, if the blended polymer is a polyarylate polymer such as "U polymer" or a polysulfide polymer such as represented by the formulae [II] to [VI], the content of the blended polymer may be upto 30% by weight based on the total weight of the resin composition without bringing about a totally adverse affect.

The PPS film of the present invention may be manufactured as follows: First of all, PPS is prepared by a well-known conventional process. That is, PPS may be prepared by, for example, reacting an alkali metal sulfide with a p-dihalogenobenzene in a polar organic solvent. Preferred examples of the solvent may include N-methylpyrrolidone and other high boiling amide polar solvents. Most frequently, sodium sulfide is employed as the alkali metal sulfide and p-dichlorobenzene is employed as the dihalogenobenzene, and the polymerization reaction is usually conducted at 200°–300° C. for several hours. The weight average molecular weight of the polymer may be controlled by controlling the concentration of the monomers in the polymerization liquid and the polymerization time. The prepared polymer may be recovered by a conventional method, for example, by flashing the polymerization system at a high temperature to evaporate the solvent, or by reprecipitating the polymer in water or in an appropriate organic solvent.

If necessary, the recovered polymer may be washed with an organic solvent having an affinity with PPS, such as diphenyl ether to dissolve low molecular weight components to control the Mw/Mn ratio. The smaller the content of the low molecular weight components, the lower the Mw/Mn ratio. The content of the low molecular weight components in the film is preferred to be 2% by weight or less in terms of the amount extracted with xylene. By this washing, the nitrogen content may also be controlled. The smaller the content of the low molecular weight components, the smaller the content of nitrogen, because the relative nitrogen content is higher in low molecular weight components than in high molecular weight components.

Then the obtained PPS is washed with water. Since the metal belonging to the IA group of the periodic table such as sodium is removed by the washing, the washing may be repeated until the content of the metal belonging to the IA group of the periodic table reaches the range defined in the present invention. The content of the IA group metal may also be controlled by the temperature, amount, and pressure of the washing water. More particularly, the content of the remaining IA group metal is smaller if the temperature of the water is higher, the amount of the water is larger, and the pressure of the water is higher. In cases where the washing is continued after the content of IA group metal has reached the prescribed range, the content of IA group metal may be controlled by using water containing the IA group metal. Similarly, in cases where a metal belonging to the IA or IIA group of the periodic table, which is other than that originally contained in the PPS is desired to be incorporated in the polymer, the metal may be incorporated in the polymer by adding a compound of the metal such as an oxide or a hydroxide in the washing water, and the content thereof in the polymer may be controlled by controlling the amount of the compound in the washing water.

The thus obtained PPS is, after admixing with additives, blended polymers or the like, if necessary, melt-extruded using an extruder, casted and solidified to obtain an amorphous film, by a well-known conventional process. The polymer may usually be kept at molten state, for example, at 320° C. for 30 minutes in the line and filter before the casting.

The thus obtained amorphous film is then stretched in the longitudinal and transverse directions by a well-known conventional method. The stretching may be conducted either by successive biaxial stretching or by simultaneous biaxial stretching. For example, in case of successive stretching, the amorphous film may be first stretched among a plurality of rollers with different circumferential velocities, which are preheated to 90°–120° C. at a draw ratio of 3.5–4.5 times the original length in the longitudinal direction and then stretched in the transverse direction at a draw ratio of 3–4 times the original length in a tenter at 90°–120° C.

The biaxially stretched film is then heatset at a constant length at, e.g., 220°–290° C., for 1 to 50 seconds to obtain a biaxially oriented PPS film of the present invention. [EXAMPLES]

The present invention will now be described by way of examples. The examples are presented for the illustration purpose only and should not be interpreted in any restrictive way.

Before describing each example, the method of determining average molecular weight, molecular weight distribution (Mw/Mn), metal content, nitrogen content, melt viscosity of the polymer constituting the film, as well as the method of determining the tensile strength as break, thermal expansion coefficient, clearness, the degree of foaming and the glass transition temperature of the film will now be described in summary.

Average Molecular Weight and Molecular Weight Distribution (Mw/Mn)

The average molecular weight and the molecular weight distribution (Mw/Mn) were measured by gel permeation chloromatography. The apparatus used and the conditions of measurement were as follows:
  Apparatus: Gel Permeation Chromatograph GPC-244 (manufactured by Waters Co., Ltd.)
  Data Processing: Gel Permeation Chromatography Data Processing System manufactured by Toray Research Center Co., Ltd.)
  Column: SHODEX KF-80M
  Solvent: 1-chloro-naphthalene
  Flow Rate: 0.7 ml/min.
  Temperature: 210° C
  Sample:
    Concentration—0.05%
    Dissolving—Completely dissolved.
    Filtration—Not carried out
  Amount Injected: 0.3 ml
  Detector: Hydrogen Flame Ionization Detector (FID)
  Molecular Weight Correction: Polystyrene Metal Content and Nitrogen Content The polymer was melted at 320° C., and the molten polymer was filtered through a filter made of stainless steel sintered fibers with a pore size of 1 $\mu$m. Alternatively, the polymer was dissolved in $\beta$-chloronaphthalene at 200° C. and then filtered using the above-mentioned filter. Thereafter, elemental analysis was conducted. In cases where heterogenous contaminants still remained after the filtration, filteration using a filter with smaller pore size was conducted to remove the heterogenous contaminants. The metal was quantified by a conventional plasma emission analysis. The nitrogen content was measured by heating the polymer at 700°–750° C. in the presence of Ni catalyst in hydrogen gas flow to convert the nitrogen in the polymer to $NH_3$, and the $NH_3$ was quantified by Terumuhren method which is a conventional coulometric titration.

Melt Viscosity

The melt viscosity was measured using a Koka-shiki flow tester at 300° C. with a shearing velocity of 200/sec.

Tensile Strength at Break (kg/mm$^2$)

The tensile strength at break was measured in accordance with JIS C-2318.

Thermal Expansion Coefficient (mm/mm/° C.)

The thermal expansion coefficient was determined using Thermomechanical Analyzer TM-3000 manufactured by Sinku Riko Co., Ltd.

Clearness

The polymer was press-molded at 300° C. and quickly cooled to obtain a transparent sheet of about 100 μm thickness. The amount of contaminants contained in the sheet were observed using a transmission type microscope at 200 magnifications.

Degree of Foaming

The fine bubbles in the film were observed and the degree of forming was rated into 5 ranks in accordance with the following criteria.

| Rank of Foaming | State |
| --- | --- |
| 5 | Bubbles are not observed at all. |
| 4 | Small bubbles which can be managed to see visually are observed partly in the film. |
| 3 | Fine bubbles are observed in almost entire film. |
| 2 | Large bubbles of 0.5 mm diameter or larger are contained partly in the film. |
| 1 | Large bubbles are contained in the entire film. |

Glass Transition Temperature

A small fraction of the film was melt-pressed at 300° C. to 310° C. and then quenched in iced water to obtain an amorphous test piece for differential thermal analysis (DSC, Differential Scanning Calorimeter). The glass transition temperature was determined by the conventional DSC method by heating the test piece.

EXAMPLE 1

In 1 kiloliter autoclave, 1 kmol of sodium sulfide nonahydrate, 0.3 kmol of anhydrous sodium benzoic acid and 250 liters of N-methylpyrrolidone were placed. The mixture was heated to 210° C. while stirring under nitrogen atmosphere to remove 160 liters of water and 5 liters of N-methylpyrrolidone. The mixture was cooled to 170° C. and then 1.01 kmol of p-dichlorobenzene was added along with 50 liters of N-methylpyrrolidone. The mixture was sealed under nitrogen gas flow and was stirred at 230° C. for 5 hours and then at 270° C. for 3 hours, followed by cooling to ambient temperature. The autoclave was opened and the content was poured into ion-exchanged water and the polymer in the form of flakes were recovered on a 200 mesh metal seive. The polymer was washed with 8 volumes of water based on the polymer and filtered 5 times. The water was ion-exchanged water with a temperature of 70° C.

The thus obtained polymer was washed with diphenyl ether at room temperature for about 30 minutes to extract and remove the low molecular weight components. The polymer was then washed with acetone and then with water at room temperature, followed by filtration and drying.

The resulting polymer was melt-extruded at 310° C. using an extruder and was casted and solidified on a rotating drum with a temperature of 40° C. to obtain an amorphous film.

The amorphous film thus obtained was stretched at a draw ratio of 3.8 times the original length in the longitudinal direction among rollers with different circumferential velocities, which are heated to 95° C., and then was stretched at a draw ratio of 3.7 times the original length in the transverse direction in a tenter at 100° C. The film was then heatset at constant length at 240° C. for 10 seconds to obtain a biaxially oriented PPS film of 50 μm thickness.

The above-mentioned various characteristics of the film were measured which are shown in the table below.

EXAMPLE 2

In a 1 kiloliter autoclave, 1 kmol of sodium sulfide nonahydrate, 0.3 kmol of anhydrous sodium benzoic acid and 250 liters of N-methylpyrrolidone were placed. The mixture was heated to 210° C. while stirring under nitrogen atmosphere to remove 160 liters fo water and 5 liters of N-methylpyrrolidone. The mixture was cooled to 170° C. and then 1.01 kmol of p-dichlorobenzene and 2 mol of 1,2,4-trichlorobenzene were added along with 50 liters of N-methylpyrrolidone. The mixture was sealed under nitrogen gas flow and was stirred at 230° C. for 5 hours and then at 270° C. for 3 hours, followed by cooling to ambient temperature. The autoclave was opened and the content was poured into ion-exchanged water and the polymer in the form of flakes were recovered on a 200 mesh metal seive. The polymer was washed with 8 volumes of water based on the polymer and filtered 5 times. The water was ion-exchanged water with a temperature of 70° C. Then the polymer was washed once with ion-exchanged water containing 1 kg of calcium acetate and then with ion-exchanged water.

The thus obtained polymer was washed with diphenyl ether as in Example 1.

A biaxially oriented film was prepared from the thus obtained polymer as in Example 1, and the various characteristics were measured, which are shown in the table.

COMPARATIVE EXAMPLE 1

The same procedure is in Example 2 was repeated except that the washing with diphenyl ether was omitted. The characteristics of the obtained film are shown in the table.

COMPARATIVE EXAMPLE 2

The same procedure as in Example 1 was repeated except that the polymer was washed once with water containing small amount of acetic acid, after the 5 times washing with water. The characteristics of the obtained film are shown in the table.

EXAMPLE 3

The same procedure as in Example 1 was repeated except that the water used for washing after the washing with diphenyl ether was completely ion-exchanged water. The characteristics of the obtained film are shown in the table.

EXAMPLE 4

The same procedure as in Example 2 was repeated except that the obtained polymer was further washed with 700 liters of ion-exchanged water containing 10 kg of calcium acetate at 60° C. for 1 hour. The characteristics of the obtained film are shown in the table. Although further treatment with calcium acetate is required for completely exchanging the sodium with calcium, it is considered that this example shows the effect of complete exchange of sodium with calcium.

As can be seen from the table, since the films of Comparative Examples 1 and 2 contain metals in the amount outside the range defined in the present invention, the tensile strength at break is smaller than those of the Examples 1-4, or the thermal stability represented by the rank of foaming is inferior to those of the Examples.

TABLE

|  | Example 1 | Example 2 | Comparative Example 1 | Comparative Example 2 | Example 3 | Example 4 |
|---|---|---|---|---|---|---|
| Melt Viscosity (200 cm$^{-1}$, 300° C.) | 5100 | 5700 | 4200 | 3800 | 5200 | 5900 |
| Metal Content (ppm) | | | | | | |
| Na | 620 | 179 | 305 | 12 | 605 | 15 |
| Ca | 8 | 330 | 710 | 4 | 0 | 495 |
| Nitrogen Content (ppm) | 440 | 460 | 640 | 510 | 450 | 470 |
| Molecular Weight | | | | | | |
| Mw | 54,000 | 65,000 | 49,000 | 46,000 | 55,000 | 64,000 |
| Mn | 10,800 | 11,400 | 6,000 | 79,00 | 10,900 | 11,000 |
| Mw/Mn | 5.0 | 5.7 | 8.2 | 5.8 | 5.0 | 5.8 |
| Degree of Foaming | 5 | 5 | 5 | 4 | 5 | 5 |
| Film Properties | | | | | | |
| Tensile Strength at Break (kg/mm$^2$) | 26.5 | 26.0 | 22.0 | 21.0 | 25.5 | 26.0 |
| Thermal Expansion Coefficient (mm/mm/°C.) | 27 × 10$^{-6}$ | 27.5 × 10$^{-6}$ | 30.5 × 10$^{-6}$ | 27 × 10$^{-6}$ | 27.5 × 10$^{-6}$ | 27 × 10$^{-6}$ |
| Clearness | Good | Slight Contaminants Observed | Slight Contaminants Observed | Good | Good | Slight Contaminants Observed |
| Glass Transition Temperature (°C.) | 92.0 | 92.4 | 89.7 | 92.3 | 92.0 | 92.3 |

We claim:

1. A biaxially oriented poly-p-phenylene sulfide film comprising poly-p-phenylene sulfide as principal component, 20-1000 ppm of at least one metal belonging to IA group of IIA group of the periodic table and 100-600 ppm of nitrogen, the poly-p-phenylene sulfide having an weight average molecular weight Mw of 30,000-90,000, and a ratio of weight average molecular weight to number average molecular weight Mw/Mn of 3-10.

2. The biaxially oriented poly-p-phenylene sulfide film of claim 1, wherein the metal is Na.

3. The biaxially oriented poly-p-phenylene sulfide film of claim 1, wherein the metal is Ca.

4. The biaxially oriented poly-p-phenylene sulfide film of claim 1, wherein the metal is Na and Ca.

5. The biaxially oriented poly-p-phenylene sulfide film of claim 1, wherein the content of the metal is 100-500 ppm.

6. The biaxially oriented poly-p-phenylene sulfide film of claim 1, wherein the weight average molecular weight Mw is 40,000-75,000.

7. The biaxially oriented poly-p-phenylene sulfide film of claim 1, wherein the ratio of weight average moelcular weight to number average molecular weight Mw/Mn is 4-8.

8. The biaxially oriented poly-p-phenylene sulfide film of claim 1, wherein the content of the nitrogen is 150-500 ppm.

9. the biaxially oriented poly-p-phenylene sulfide film of claim 1, which has a glass transition temperature of 90°-95° C.

* * * * *